US009305425B2

(12) United States Patent
Sareli et al.

(10) Patent No.: US 9,305,425 B2
(45) **Date of Patent: *Apr. 5, 2016**

(54) INTEGRATION OF MULTIPLE GAMES

(71) Applicant: Zynga Inc., San Francisco, CA (US)

(72) Inventors: Shane Sareli, San Francisco, CA (US); Lamberto M. Alvaro, San Francisco, CA (US); Laurence M. Toney, San Francisco, CA (US); Nir Leibovich, San Francisco, CA (US); Sergey Pervov, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,252

(22) Filed: Oct. 3, 2013

(65) Prior Publication Data

US 2014/0038726 A1 Feb. 6, 2014

Related U.S. Application Data

(63) Continuation of application No. 13/297,533, filed on Nov. 16, 2011, now Pat. No. 8,585,506.

(51) Int. Cl.
*A63F 13/10* (2006.01)
*G07F 17/32* (2006.01)

(52) U.S. Cl.
CPC ........ *G07F 17/3225* (2013.01); *G07F 17/3223* (2013.01); *G07F 17/3227* (2013.01)

(58) Field of Classification Search
USPC ........................................ 463/16–43; 273/292
See application file for complete search history.

(56) References Cited

U.S. PATENT DOCUMENTS

| | | | | |
|---|---|---|---|---|
| 2011/0269548 | A1* | 11/2011 | Barclay et al. | 463/42 |
| 2011/0300926 | A1* | 12/2011 | Englman et al. | 463/25 |
| 2012/0015714 | A1* | 1/2012 | Ocko et al. | 463/25 |
| 2012/0108308 | A1* | 5/2012 | Hong et al. | 463/13 |
| 2012/0122589 | A1* | 5/2012 | Kelly et al. | 463/42 |
| 2012/0184349 | A1* | 7/2012 | Barclay et al. | 463/20 |
| 2012/0202587 | A1* | 8/2012 | Allen et al. | 463/25 |

* cited by examiner

*Primary Examiner* — Masud Ahmed
(74) *Attorney, Agent, or Firm* — Martine Penilla Group, LLP

(57) ABSTRACT

Methods, systems, and computer programs are presented for providing online games that are non-monolithic programs. One method includes an operation for providing access to a plurality of online games and to a wrapper game. Each of the online games and the wrapper game is directly accessible to be loaded utilizing a corresponding internet address, which is different for each online game. The wrapper game includes options to load any of the plurality of online games. In addition, the method includes another operation for providing a chat interface in the plurality of online games and in the wrapper game. The chat interface allows users accessing any of the online games to exchange messages with other users accessing any of the online games, and the chat interface is unavailable to users currently absent from the online games and absent from the wrapper game.

20 Claims, 10 Drawing Sheets

INTEGRATION OF MULTIPLE GAMES

CLAIM OF PRIORITY

This application is a Continuation Application under 35 USC §120 and claims priority from U.S. application Ser. No. 13/297,533, entitled "INTEGRATION OF MULTIPLE GAMES", and filed on Nov. 16, 2011, and is herein incorporated by reference.

BACKGROUND

1. Field of the Invention

The present invention relates to methods for improving social interactions in online games, and more particularly, methods, computer programs, and systems for providing a better integration of related online games.

2. Description of the Related Art

Online games that allow players to interact with other players have become popular. Some online games, such as chess or bridge, have a small number of players that play together at the same time. Online game operators, also referred to as social game operators, harness the power of online social networks, to design games that allow players to interact with their friends within the games.

Most online games are autonomous games, because game activities performed inside a game affect only that one game. If a player likes to play several related games, there is no continuity between the games. For example, the player must define friends for each of the online games, and a virtual currency must be carried in each of the online games. This separation does not provide an appealing environment to online game players. It is in this context that embodiments arise.

SUMMARY

Methods, systems, and computer programs are presented for providing online games. It should be appreciated that the present invention can be implemented in numerous ways, such as a process, an apparatus, a system, a device or a method on a computer readable medium. Several inventive embodiments of the present invention are described below.

In one embodiment, a method includes an operation for providing access to a plurality of online games and to a wrapper game. Each of the online games and the wrapper game is directly accessible to be loaded utilizing a corresponding internet address, which is different for each online game. The wrapper game includes options to load any of the plurality of online games. In addition, the method includes another operation for providing a chat interface in the plurality of online games and in the wrapper game. The chat interface allows users accessing any of the online games to exchange messages with other users accessing any of the online games, and the chat interface is unavailable to users currently absent from the online games and absent from the wrapper game. Each online game and the wrapper game is a non-monolithic program that requires execution to enable play. The non-monolithic program, when loaded and executed, provides access to one online game, and accessing another online game from the non-monolithic program requires that another non-monolithic program be loaded and executed by a computing device. In one embodiment, the operations of the method are executed by a processor.

In another embodiment, a method includes an operation for providing access to a plurality of online games and to a wrapper game. Each of the online games and the wrapper game is directly accessible to be loaded utilizing a corresponding internet address which is different for each online game, and the wrapper game includes options to load any of the plurality of online games. Further, the method includes an operation for providing a chat interface in the plurality of online games and in the wrapper game. The chat interface allows users accessing any of the online games to exchange messages with other users accessing any of the online games, and the chat interface is unavailable to users currently absent from the online games and absent from the wrapper game. Further yet, the method includes an operation for providing a playing-together interface to players of the plurality of online games, where a first player and a second player playing together will move together from online game to online game, and from room to room within an online game. Each online game and the wrapper game is a non-monolithic program that requires execution to enable play.

In yet another embodiment, a non-transitory computer-readable storage medium storing a computer program for providing online games is provided. The computer-readable storage medium includes program instructions for providing access to a plurality of online games and to a wrapper game, where each of the online games and the wrapper game is directly accessible to be loaded utilizing a corresponding internet address which is different for each online game. Further, the wrapper game includes options to load any of the plurality of online games. The storage medium further includes program instructions for providing a chat interface in the plurality of online games and the wrapper game, where the chat interface allows users accessing any of the online games to exchange messages with other users accessing any of the online games. The chat interface is unavailable to users currently absent from the online games and absent from the wrapper game. Each online game and the wrapper game is a non-monolithic program that requires execution to enable play.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

The following embodiments describe methods, computer programs, and systems for providing online social games. It will be apparent, that the present embodiments may be practiced without some or all of these specific details. In other instances, well known process operations have not been described in detail in order not to unnecessarily obscure the present embodiments.

Figure 1:
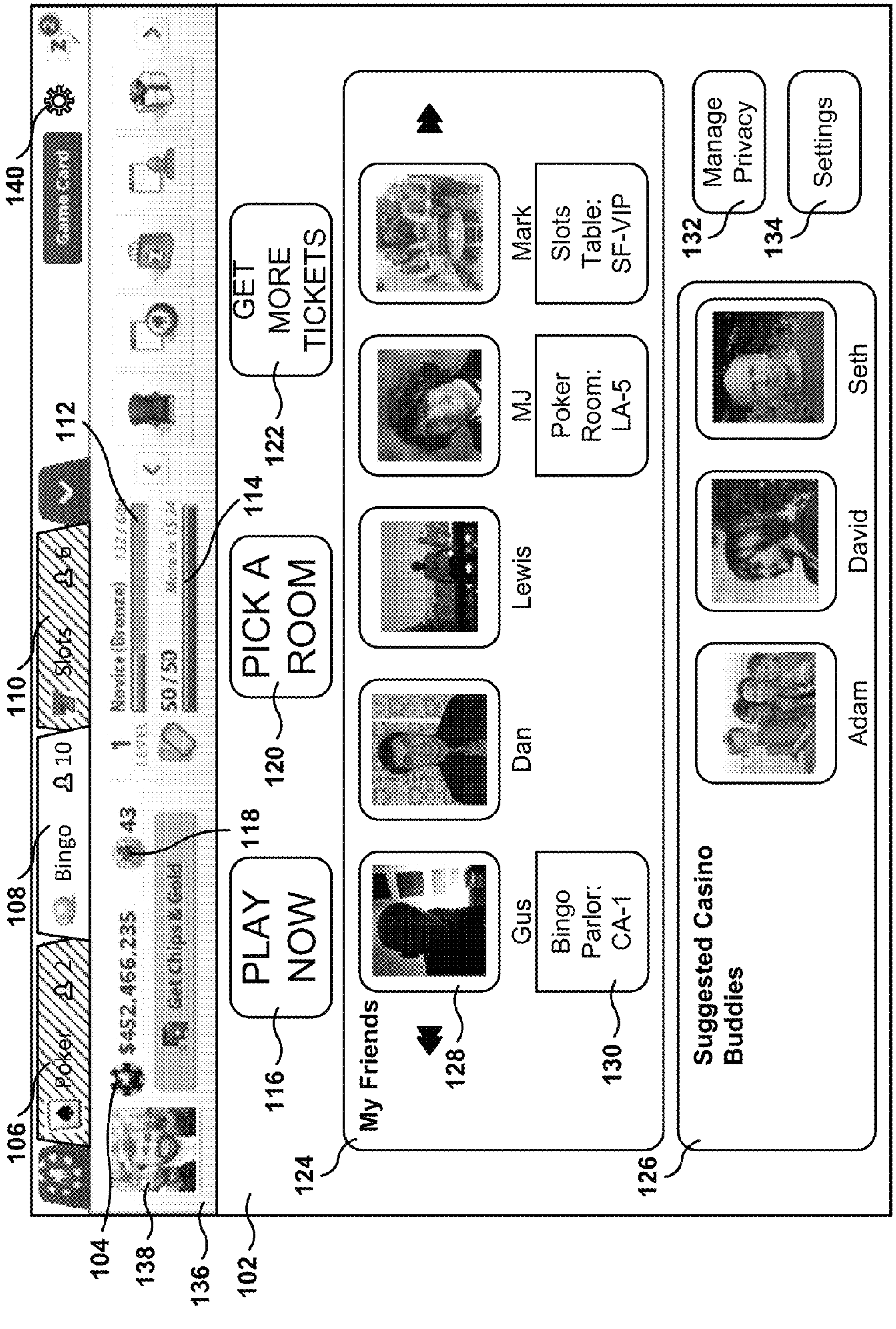
FIG. 1 illustrates an embodiment of a web page for playing a casino game with friends.

FIG. 1 illustrates an embodiment of a web page 102 for playing a casino game with friends. FIG. 1 shows the lobby of a bingo parlor. The bingo game is one of the games in a casino game, which includes a plurality of different casino games. In one embodiment, the casino games include a persistent navigation bar 136 at the top, which allows the player to easily switch from one game in the casino to another game. Navigation bar 136 is called persistent, because the navigation bar is available in all the casino games.

In the embodiment shown in FIG. 1, the casino game includes poker, bingo, and slots, but other combinations of casino games are possible. Each casino game has a tab in the game navigation bar 136, which means that there are three tabs in the embodiment of FIG. 1: poker tab 106, bingo tab 108, and slots tab 110. In one embodiment, the tab associated with the current game is highlighted in some fashion, such as by having a different color background, having a larger tab, having a name with a bigger font, etc. In another embodiment, the tabs are similar for all the games, and the current game is identified via other signals in the webpage, such as having the game name somewhere else on the page.

In one embodiment, the persistent navigation bar 136 is exactly identical in all the casino games, and in other embodiment, the persistent navigation bar 136 may show slight variations depending on the game. For example, in one embodiment the persistent navigation bar 136 includes a tab to go to the casino lobby (i.e., to the casino game), but in another embodiment, the navigation bar 136 does not include a tab for the casino lobby. The navigation bar 136 may also include game dependant items, such as the skill level achieved in the current game. Since the skill level varies from game to game, the skill level for the current game will be different in each of the games.

Further, the game navigation bar 136 may include one or more of a user picture 138, a first game currency 104, a second game currency 118, a skill level area in the current game 112, an energy level 114, shortcuts to other games or applications, a global casino skill level (not shown), etc. The global casino skill level is a game level indicating the progress of the player in the casino, and is calculated based on the progress made in all the casino games.

In one embodiment, each of the games in the casino is a different application that can be invoked by itself, without having to go through the casino application. For example, each of the casino games may be played on a Facebook page, and each of the games may be included as a shortcut on the Facebook page, as described in more detail below with reference to FIG. 5. In addition, the casino game may also be played on the Facebook page and may also be a shortcut on the Facebook page.

Although all the casino games are separate applications, the casino games share some game data. In one embodiment, the casino games use the same virtual currency 104. This means that the player may increase the chip count (i.e., virtual currency) by winning a bingo game, and decrease the chip count by losing a poker game. In another embodiment, some game data is shared among two or more games, but is not shared by other games. For example, the energy level 114 is shared by the bingo game and the slots game, but does not apply to the poker game. Therefore, as the user plays several game bingo games, the energy level may decrease, and as the user plays slots games, this energy level may also decrease. The user may purchase more energy with virtual currency, such as second currency 118.

In addition to sharing game data, the casino games may also share other settings 140, also referred to herein as global settings. In one embodiment, the casino games may share one or more of a privacy setting (e.g., allowing friends to see my activities, allowing some friends to see my activities, allowing everyone to see my activities, etc.), game buddies, language, email notifications, etc. In another embodiment, the user has an option in the game to set settings 134 and privacy options 132 for the casino global settings, another option to set the in-game settings that are pertinent to the current game.

In one embodiment, the player has the ability to define game friends or buddies. The friends may be linked to the player on a social site, or may have been added directly from within the game. Friend bar 124 provides information to the player on the current activities of friends. Friend bar 124 may include, for each player, a picture of the player which is obtained from a social networking site or from a profile of the player in the casino or the bingo game. If a friend is currently in the casino playing a game, information area 130 includes information about the friend, such as the game that the friend is playing and the room or location where the player is within the game. For example, the game might indicate that a friend is in "bingo parlor CA-1," so the player may join the friend by going to room CA-1.

In one embodiment, the game provides a suggested friends bar 126, also referred to as "suggested casino buddies," with one or more suggestions for new friends in the casino. When the player clicks on one of the suggested friends, the game provides user information, such as profile information, relationship to the player (e.g., "friend of Lewis," "Facebook friend"), etc. Additionally, the game may display friendship requests from other players, and the player is given the option to accept or reject the requests.

The casino game enables friends to play together casino games. In one embodiment, a player may select to move around the casino with a friend. This means that if a first player and a second player decide to play together, when the first player goes to a room in the casino to play a game, the second player will be taken to the same room by the game. In other embodiment, if the player wants to join a friend in a game, the player may click on the information area 130 associated with the friend and the game will take the player to the same room.

The game of FIG. 1 also includes a button to start playing the game 116, another button to select a bingo room 120, and another button to purchase more tickets or chips 122.

It is noted that the embodiments illustrated in FIG. 1 are exemplary. Other embodiments may utilize different layouts, different options, or different games in the casino. The embodiments illustrated in FIG. 1 should therefore not be interpreted to be exclusive or limiting, but rather exemplary or illustrative.

Figure 2:
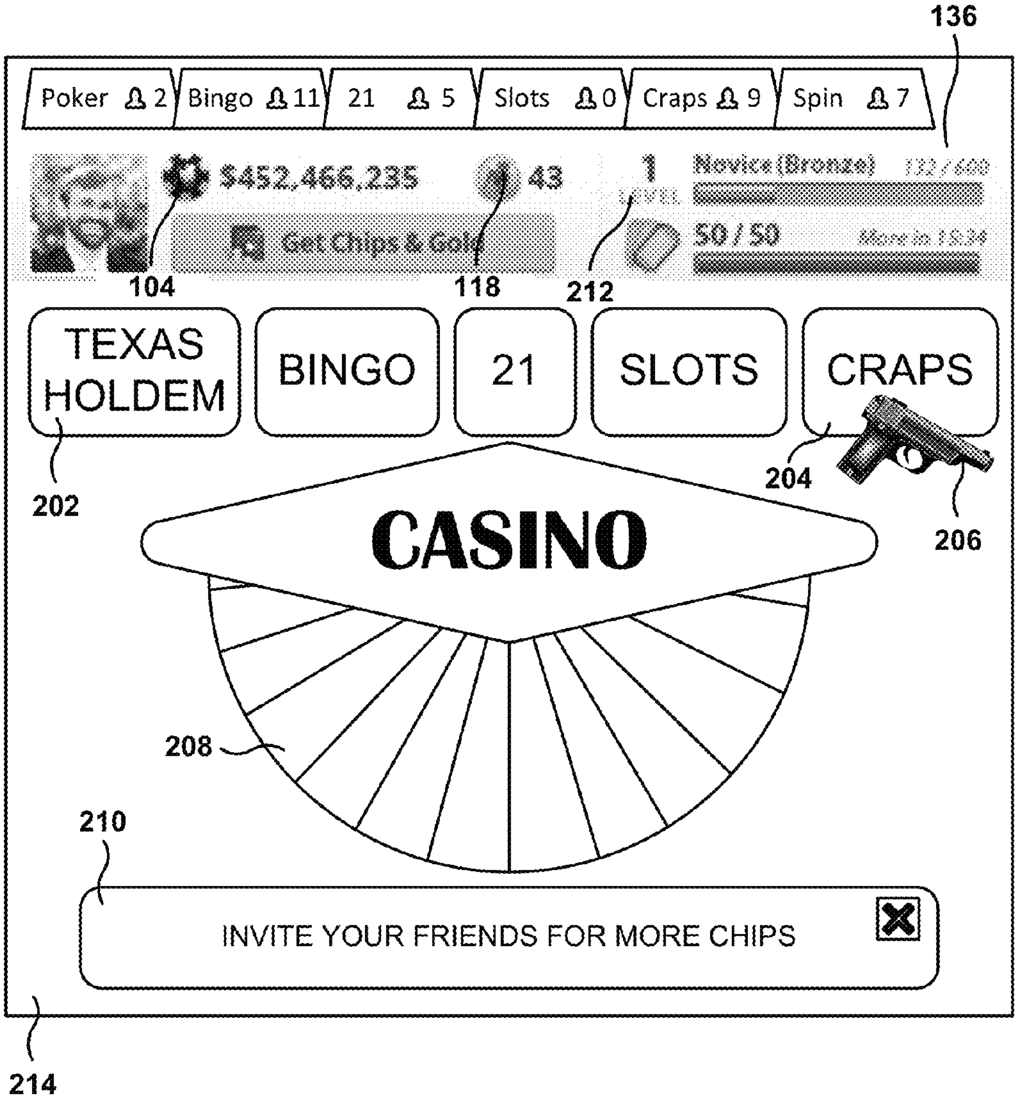
FIG. 2 illustrates a web page for selecting casino games, according to one embodiment.

FIG. 2 illustrates a web page for selecting casino games, according to one embodiment. The casino-game welcome page 214 provides options to select casino games, and includes game navigation bar 136, a plurality of buttons for selecting casino games, and a button 210 to invite friends to the casino.

The game navigation bar 136 is persistent across the casino game and the games associated with the casino. As previously described with reference to FIG. 1, the game navigation bar 136 includes, among other things, a first currency 104, a second currency 118, and a casino skill level 212. The global casino skill level 212 indicates the progress of the player in the casino, and is calculated based on the progress made in all the games associated with the casino.

The game selection buttons include buttons to play Texas Holdem Poker 202, Bingo, 21, Slots, Craps 204, and Spin the wheel 208. If the player selects one of these buttons, the player will be taken to the corresponding game, such as being transported to the lobby of the Texas Holdem Poker game.

In one embodiment, a special item obtained in one game may be utilized in another. For example, a gun 206 acquired in a Mafia Wars game opens a special table in the craps game 204 reserved for mafia members in the Mafia Wars game. Additionally, the special item may be acquired in one casino game and then used in another casino game. For example, a player that wins a bingo game may get a reward that allows access to a VIP poker room.

The casino game may also integrate some of the activities the player performs in the different casino games. Although each casino game is independent from other casino games, at least independent in the way progress is made within each game, the casino game may have a progress measure that requires progress in two or more casino games. Similar to a decathlon in the Olympic Games, where players compete in ten different events to obtain a global decathlon score, players may perform tasks in multiple games to obtain a reward in the casino. For example, the player is given one week in which to play poker, bingo, and slots, and the more time spent playing these games, or the more chips are purchased, the higher the score will be. Players are allowed to compete with friends for multi-game competitions. For example, two friends may choose to play a competition over the weekend to see who wins more chips by playing poker, bingo, or slot machines.

Figure 3:
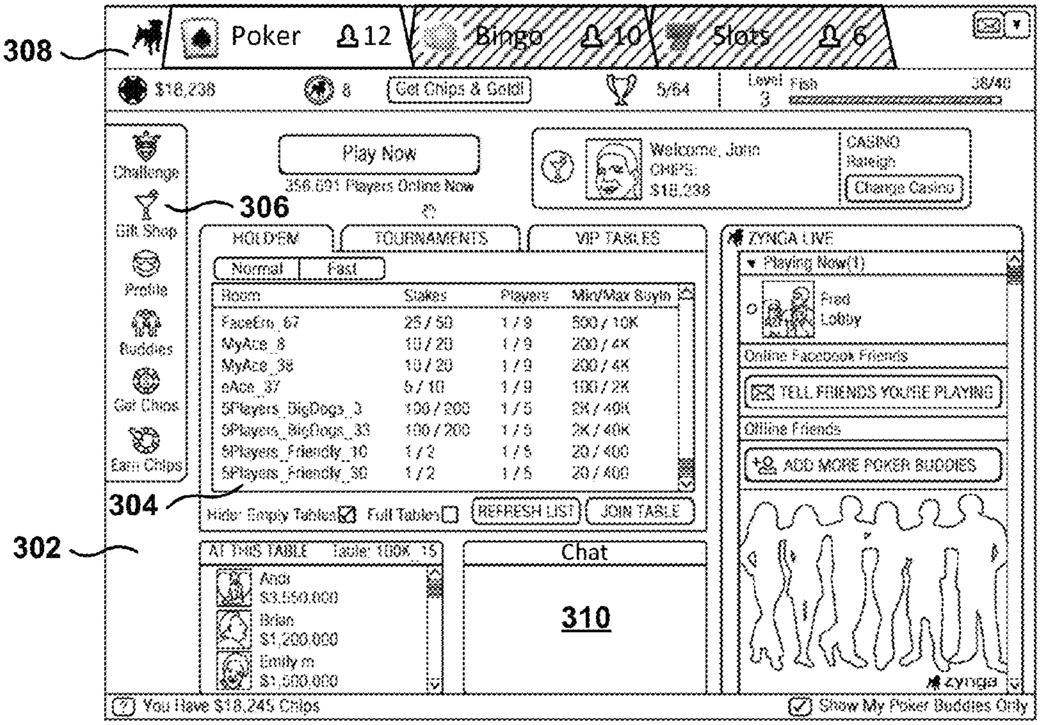
FIG. 3 illustrates an embodiment of a web page for playing a poker game.

FIG. 3 illustrates an embodiment of a web page for playing a poker game. FIG. 3 shows the lobby 302 of a poker game, which includes a list of poker rooms 304 where the player can choose to play, if entry to that particular room is enabled for this player. The lobby 302 also includes an option to purchase items in the gift shop 306. Items may be acquired with one of the two currencies available in the game, as described above.

In addition, the lobby 302 also includes the persistent navigation bar 308, which is available in the casino games. In one embodiment, the persistent navigation bar is identical for all the games, but in other embodiments, there may be some variation of the persistent navigation bar, such as including options available only for the particular game the user display. Therefore, when the player is in the poker lobby, the player has an option to select another game by selecting the tab associated with that game. If the player clicks on the bingo tab, then the player will be taken to the bingo game.

In one embodiment, players can chat 310 with any friend that is currently in the casino, even if the players are not in the same game or in the same room. In another embodiment, the chat includes a plurality of friends.

Figure 4:
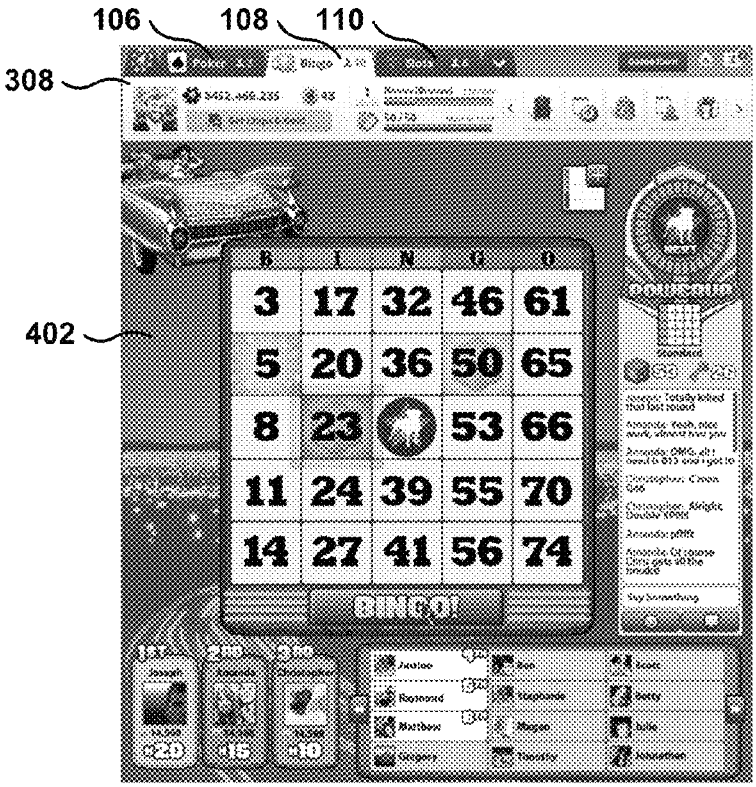
FIG. 4 illustrates an embodiment of a web page for playing a bingo game.

FIG. 4 illustrates an embodiment of a web page for playing a bingo game. The bingo game webpage 402 includes the persistent navigation bar 308, which tabs for the different games. In embodiment of FIG. 4, there are 3 tabs: Poker tab 106, Bingo tab 108, and Slots tab 110. The Bingo tab 108 is highlighted with a different background to signal that the player is in the Bingo game.

In the player clicks in the Poker tab 106, the player will leave the Bingo game and be transported to the Poker game, such as for example to the lobby of the Poker game, or to a room where one of the player's friends is playing poker. The bingo game includes a Bingo card for the current Bingo game. The game also includes other players in the current game. As discussed above, the chips utilized to buy the Bingo cards are the same chips that can be used to play poker or the slot machines.

Although the persistent navigation bar is a common element in the interface for the casino games, other interface elements (i.e. GUI elements) may also be shared by the different casino games. For example, the shared interface may include one or more of a navigation bar situated on the left side of the GUI, a navigation bar situated on the right side of the GUI, a navigation bar situated at the bottom of the GUI, single addressable elements within any part of the GUI (e.g., a button to purchase chips, a link to go to the casino lobby, a link to chat with friends anywhere in the casino, etc.), etc. The persistent navigation bar illustrated herein should therefore not be interpreted to be exclusive or limiting, but rather exemplary or illustrative.

Figure 5:
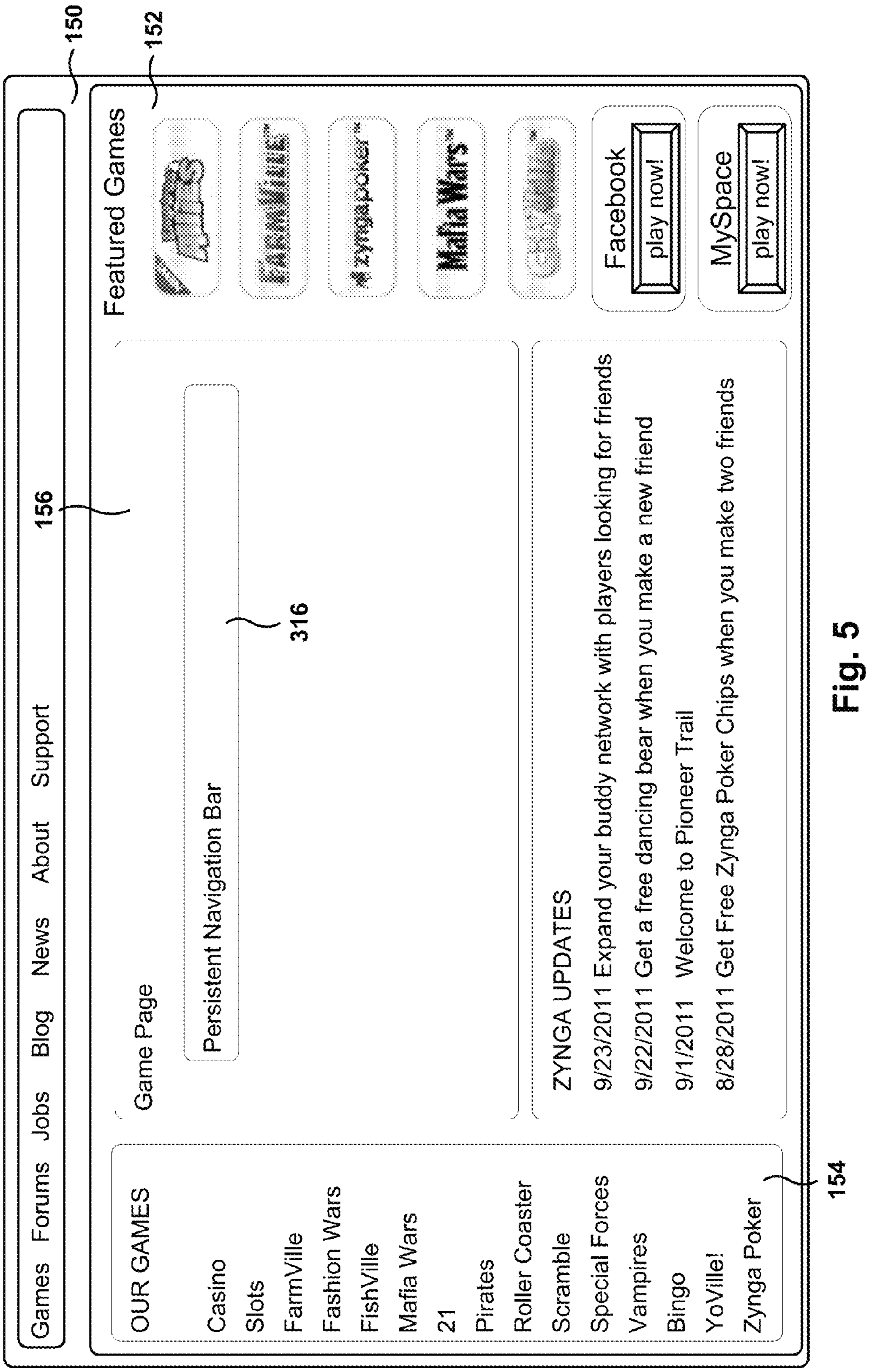
FIG. 5 illustrates an embodiment of a web page for playing an online game.

FIG. 5 illustrates an embodiment of a web page 150 for playing an online game. A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device. Some web pages are dynamic and are constructed at the time the web page is requested by a network user. As a result, the actual content included in dynamic web pages may vary over time. In addition, web pages may include multimedia content (e.g., image, video, or audio), or embedded references thereto, as well as text content.

Web page 150 is one embodiment of a page designed for playing games online via web browsers. In this embodiment, a list of games is presented for selection by the player, and a list of featured games 152 identifies popular games. In one embodiment, the game is played in game area 156 as an embedded component that may use any technology for presenting multimedia dynamic content, such as Hyper Text Markup Language 5 (HTML5), Adobe Flash®, etc. The game area 156 includes a persistent navigation bar 316, as previously described with reference to FIGS. 1-4.

Adobe Flash (formerly known as Macromedia Flash) is a multimedia platform for adding animation and interactivity to web pages. A Flash component (e.g., game area 156) may be embedded in a web page (e.g., web page 150) to create animation, advertisements, or games and to integrate video into the web page. Adobe Flash can manipulate vector and raster graphics and support bidirectional streaming of audio and video. In one embodiment, Adobe Flash libraries are used with the Extensible Markup Language (XML) capabilities of the web browsers to render rich content in the browsers. This technology is known as Asynchronous Flash and XML.

Another technology for displaying dynamic content in a web page is HTML5. HTML5's features include media playback and offline storage. With a predecessor version to HTML5, named HTML4, sites have to reach for Adobe Flash (or Silverlight) to show a video or play music. However, HTML5 lets sites directly embed media using Hyper Text Markup Language (HTML) tags (e.g., "<video>" and "<audio>"), and plugins are not required.

In one embodiment, games include objects, such as characters, currencies, tools, assets, social relations, etc. For example, in a war game, the characters may be the soldiers fighting on respective sides of the war. In addition, there may be weapons used by the soldiers and objects around the battlefield (e.g., buildings, trees, animals, mountains, rivers, and so on). Each game object may be defined according to a predetermined syntax. For example, the definition of a game object may include shape, texture, physical capabilities, connection or relationship with other game objects, etc.

In another embodiment, a game application is embedded in a web page (e.g., web page 150) and the players play the game via web browsers. The display of a game is sometimes referred to as the "stage" of the game. Thus, the stage of the game may be implemented as Adobe Flash or HTML5 component embedded in the web page. For example, the stage is essentially a data structure that defines some of the basic elements of the game, such as aspect ratio and display size. At any given time, a game scene may be rendered and displayed on the stage by attaching one or more game objects to the stage.

Figure 6:
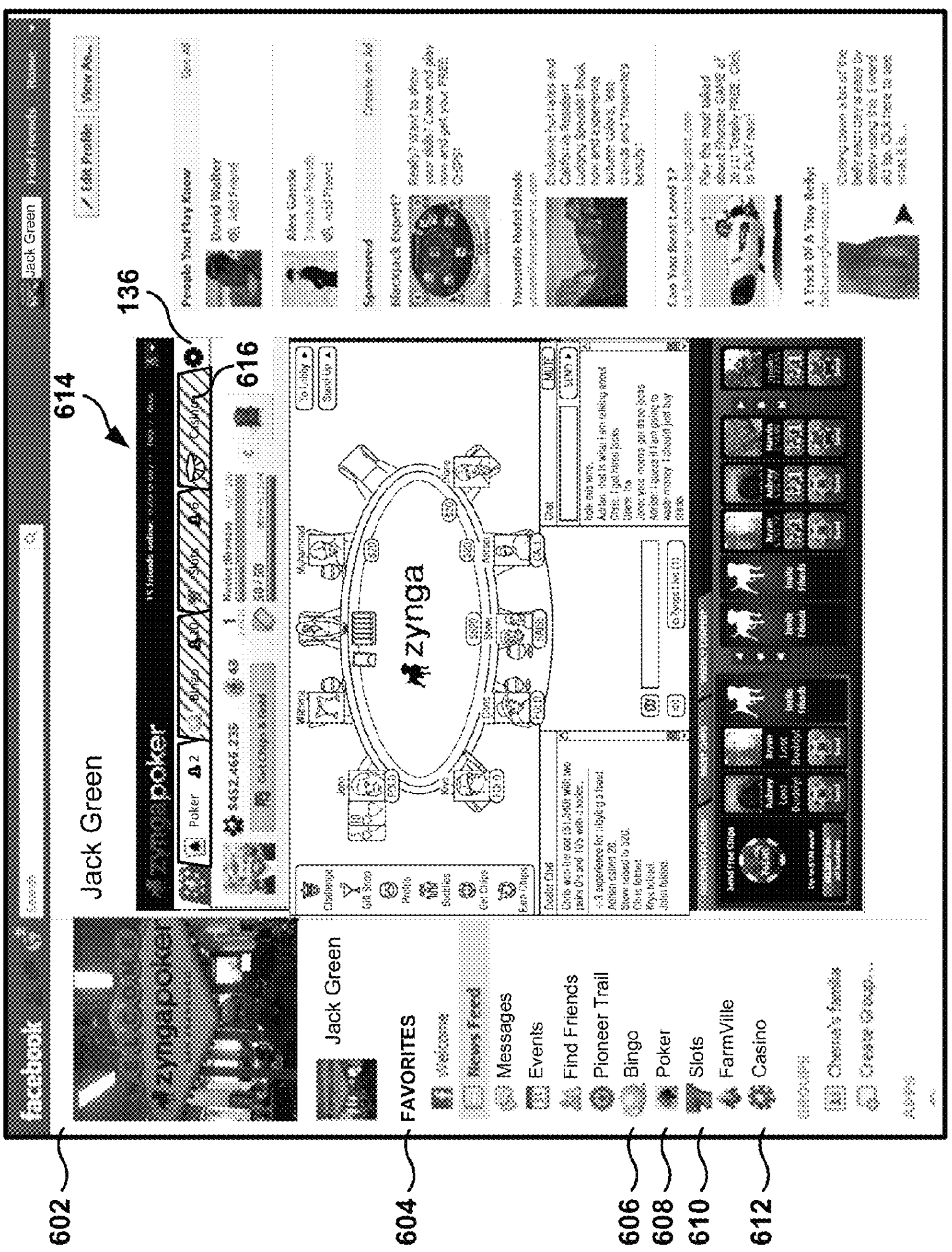
FIG. 6 illustrates an embodiment of a web page for playing casino games within a social website.

FIG. 6 illustrates an embodiment of a web page 602 for playing casino games within a social website. Webpage 602 includes a list of favorites, which are shortcuts to applications that can be executed within the environment of the social network website. For example, Favorites 604 includes shortcuts to play games, such as Bingo 606, Poker 608, Slots 610, and the Casino wrapper game 612. When the player selects one of the favorites, the corresponding application or game is loaded in stage area 614.

It is noted that each of the casino games is a separate Facebook application, that can be invoked from the Favorites menu, or from some other link provided while browsing in the Facebook site. For example, in one embodiment, each of the casino games has a Facebook page. Players may visit the Facebook page of one casino game and select playing the game by clicking on a link in the Facebook page of the casino game.

Some casino games in the market provide a link in Facebook to load the casino game, and once the player is in the casino game the player is given the option of selecting one of the games in the casino. However, these casino games are monolithic applications that do not provide a direct access to the individual games in the casino, because to access a game in the casino the player must always go through the casino application. As used herein, a monolithic application is a program that when loaded and executed provides access to all the individual games without having to load and execute another program. In contrast, a non-monolithic program is a program that, when loaded and executed, provides access to one individual game, and to access another individual game from the non-monolithic program, another non-monolithic program must be loaded and executed by a computing device. Embodiments of the invention allow a player to access each casino game directly without having to go through the Casino wrapper game because each casino game is a non-monolithic program. Further, the Casino wrapper game is also a non-monolithic program that can be used to provide access to the individual non-monolithic online games. In one embodiment, one monolithic program may be utilized to access more than one individual games, but there is no monolithic program that may access all the individual games.

When the player selects the Poker game 608, the Poker game is loaded in the stage area 614. The Poker game includes the persistent navigation bar 136 with tabs for the several casino games. In one embodiment, persistent navigation bar 136 includes, besides the tabs to access the individual casino games, a tab 616 to access the casino game.

If the player wants to change casino games, the player has two options: the player may click on one of the tabs in persistent navigation bar 136 (e.g. bingo tab), or the player may select one of the shortcuts in Favorites area 604 (e.g. bingo link 606). In either case, the selected casino game will be loaded in stage area 614.

It is noted that the embodiments illustrated in FIG. 6 are exemplary. Other embodiments may utilize different layouts, shortcuts, buttons, etc. The embodiments illustrated in FIG. 6 should therefore not be interpreted to be exclusive or limiting, but rather exemplary or illustrative.

In another embodiment, the player is able to access the casino games directly from a website that is not a social website. For example, the player may access the casino and the casino games directly, by selecting a hyperlink in the website, such as the website presented in FIG. 5. Again, the player does not have to access the casino game to reach one of the individual games in the casino. For example, a player may select a hyperlink that loads the poker game in the webpage without having to first go to the casino game.

Figure 7:
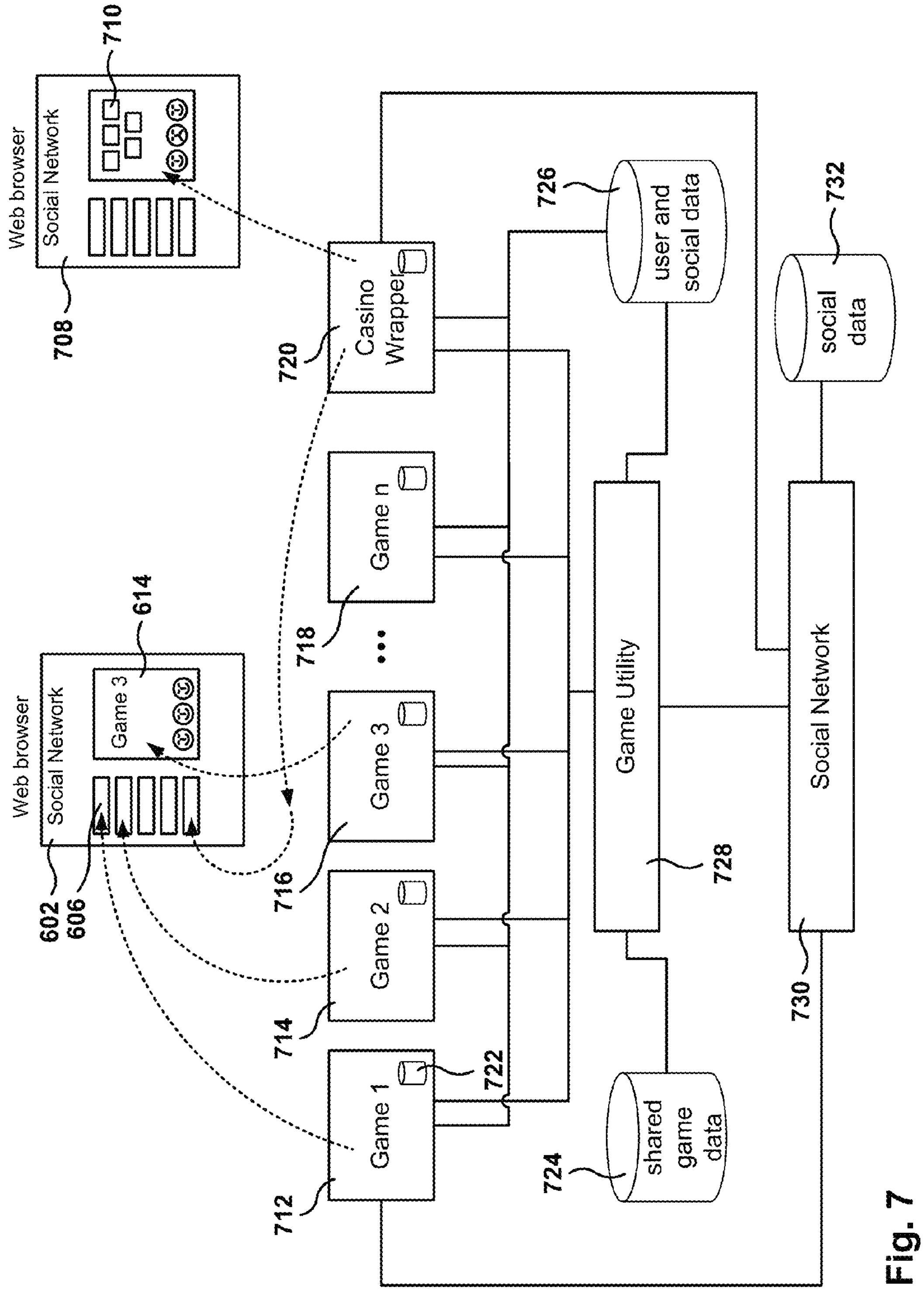
FIG. 7 is a simplified schematic diagram of the architecture for playing online games, according to one embodiment.

FIG. 7 is a simplified schematic diagram of the architecture for playing games, according to one embodiment. The casino wrapper architecture includes a plurality of games, a game utility module 728, interfaces to one or more social networks, and a plurality of databases. More details on the social network operations are given below with reference to FIG. 10.

The casino includes game modules 712, 714, 716, 718, and the casino wrapper module 720. Each of the games may include game storage 722 holding information for the corresponding game, and each game may access shared game storage, such as shared game data 724, social data 732, and user and social data 726. Game modules 712, 714, 716, 718, may be implemented in a distributed fashion, where each game module is implemented in one or more game servers, but several game modules may also be hosted in one game server.

The games may be played on a web browser 602, and the games may be played from within a social network site or from other Internet websites. As discussed previously with reference to FIG. 6, the social website includes, in one embodiment, a game stage area 614 with shortcuts to one or more casino games, and a shortcut to the casino wrapper game 720. Further, web browser page 708 includes an instance of the casino wrapper game 720. The game stage for the casino wrapper 720 includes shortcuts to the casino games, so the player may access the casino games from within the casino wrapper game.

Game utility module 728 is shared by all the games, and provides utilities accessible by the games. The utilities include one or more of management of a first shared virtual currency, management of a second shared virtual currency, skill level within each of the games, assets owned by the player accessible via the inventory option in the game, players social and profile information, tournament information, log of past playing times, etc.

In one embodiment, the game utility 728 is implemented as a separate process that provides an interface to the different games. In another embodiment, the game utility 728 is implemented as shared code (e.g., program instructions) that may be utilized by the different games.

The shared data is managed by the game utility, although it may also be accessed directly from each of the games. The shared game data is stored in shared game data database 724, and the user and social data is stored in user and social data database 726. Shared game data database 724, as its name implies, is used to store data shared by the different games, such as virtual currency, links to other casino games, a persistent navigation bar, chat information, tournament information, etc. The user and social data database 726 includes information about the user (e.g., cached profile information from a social website, user profile information for the casino, user preferences, etc.), and user social data (e.g., cached social information from the social website, friends in the casino, past history of social interactions, friendship requests, suggested new friends, etc.).

Social network 730 provides an Application Programming Interfaces (API) that may be accessed by the game utility 728, or may be accessed by one of the games directly. Social network 730 provides access to social data stored in database 732. As discussed above, the social data may be cached by the gaming infrastructure, such as a user and social data database 726, but it may also be stored in other game infrastructure servers (see for example FIGS. 9 and 10).

Figure 8:
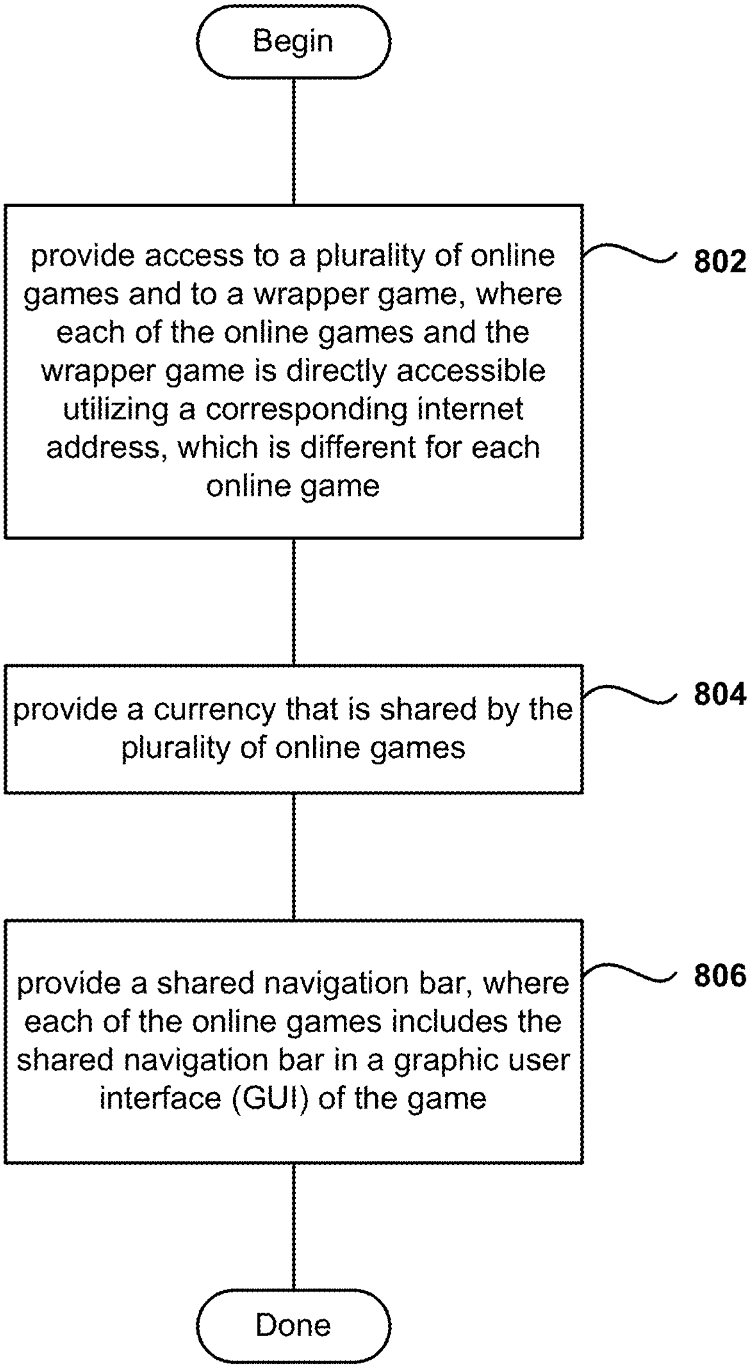
FIG. 8 shows a flowchart illustrating an algorithm for providing online games, in accordance with one embodiment of the invention.

FIG. 8 shows a flowchart illustrating an algorithm for providing online games, in accordance with one embodiment of the invention. In operation 802, access is provided to a plurality of online games and to a wrapper game, and each of the online games and the wrapper game are directly accessible utilizing a corresponding internet address, which is different for each online game. For example, the online games are directly accessible from a social network website, such as Facebook (see one embodiment illustrated in FIG. 6).

From operation 802, the method flows to operation 804, where a currency, which is shared by the plurality of online games, is provided. Each of the online games is operable to increase or decrease the amount of shared currency, i.e., as the player performs game activities in the different online games, the amount of currency is increased or decreased. Further, in one embodiment, the amount of currency may be increased with the purchase of currency utilizing cash or credit.

From operation 804, the method flows to operation 806, where a shared navigation bar is provided. Each of the online games includes the shared navigation bar in a graphic user interface (GUI) of the game (see for example the embodiments illustrated in FIGS. 1-6). At least one operation of the method is executed through a processor.

Figure 9:
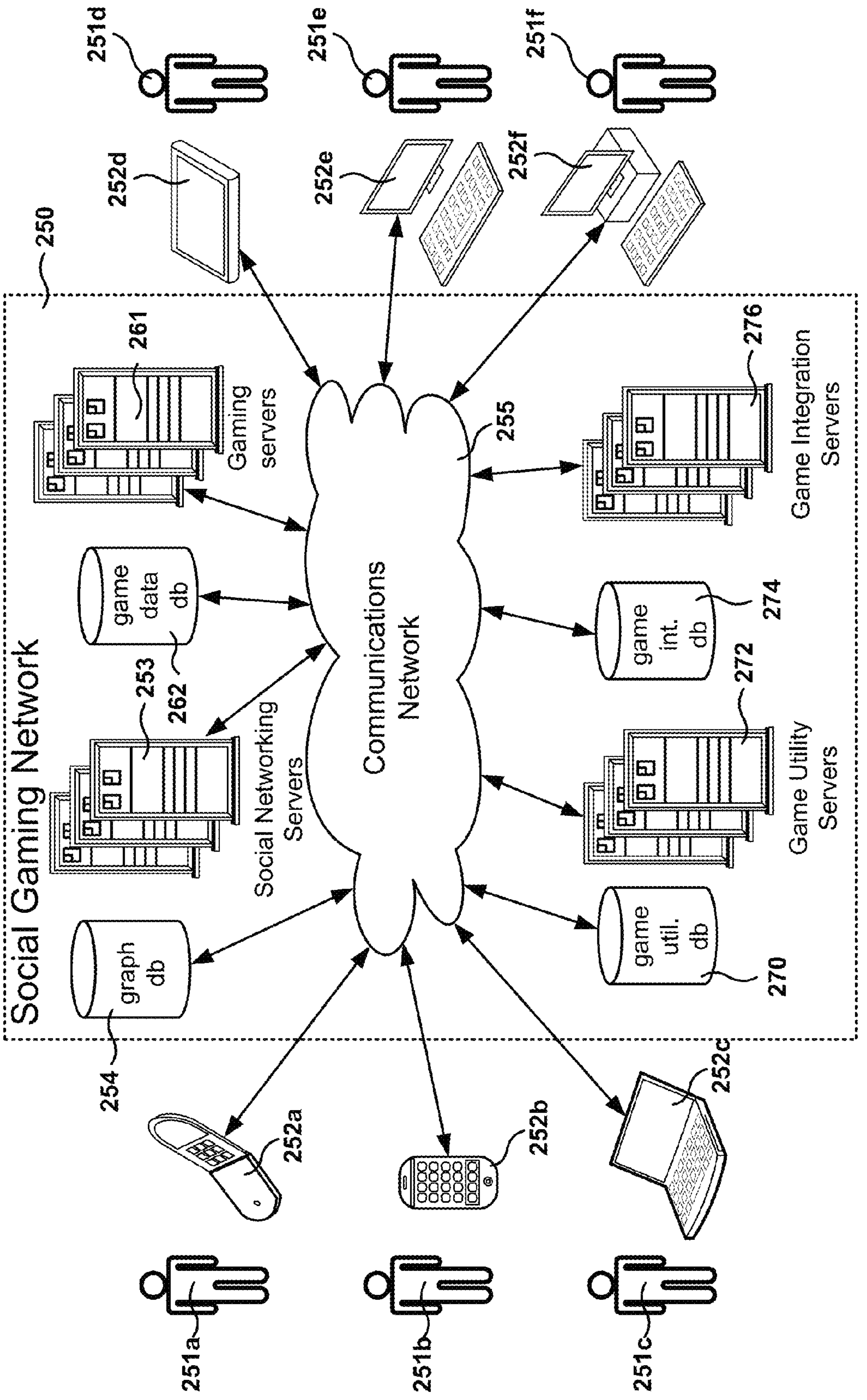
FIG. 9 shows a block diagram illustrating a social gaming network architecture, according to one embodiment.

FIG. 9 shows a block diagram illustrating a social gaming network architecture, according to one embodiment. In some implementations, a plurality of players (e.g., 251*a*-251*f*) may be utilizing a social gaming network 250. Each player interacts with the social gaming network via one or more client devices (e.g., client devices 252*a*-252*f*). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming realm databases 262 store data related to the gaming services, such as the gaming applications and modules, virtual gaming environment ("realm") data, player gaming session data, player scores, player virtual gaming profiles, game stage levels, etc. The gaming servers may utilize the data from the gaming realm databases to perform the computations related to providing gaming services for the players. In some implementations, a server load database 264 stores gaming server load statistics, such as computational load, server responses times, etc. The social gaming network may include one or more load balancing servers 263.

Game Utility Servers 272 provide game utilities shared by a plurality of casino games, and game utility information database 270 stores shared gaming data. In addition, one or more game integration servers 276 deliver functionality to make available games (e.g., casino rapper game) that integrate two or more independently accessible games (e.g., poker, bingo, slots, etc.). Database 274 stores data for the game integration game (e.g., skill level reached at the integration game).

Figure 10:
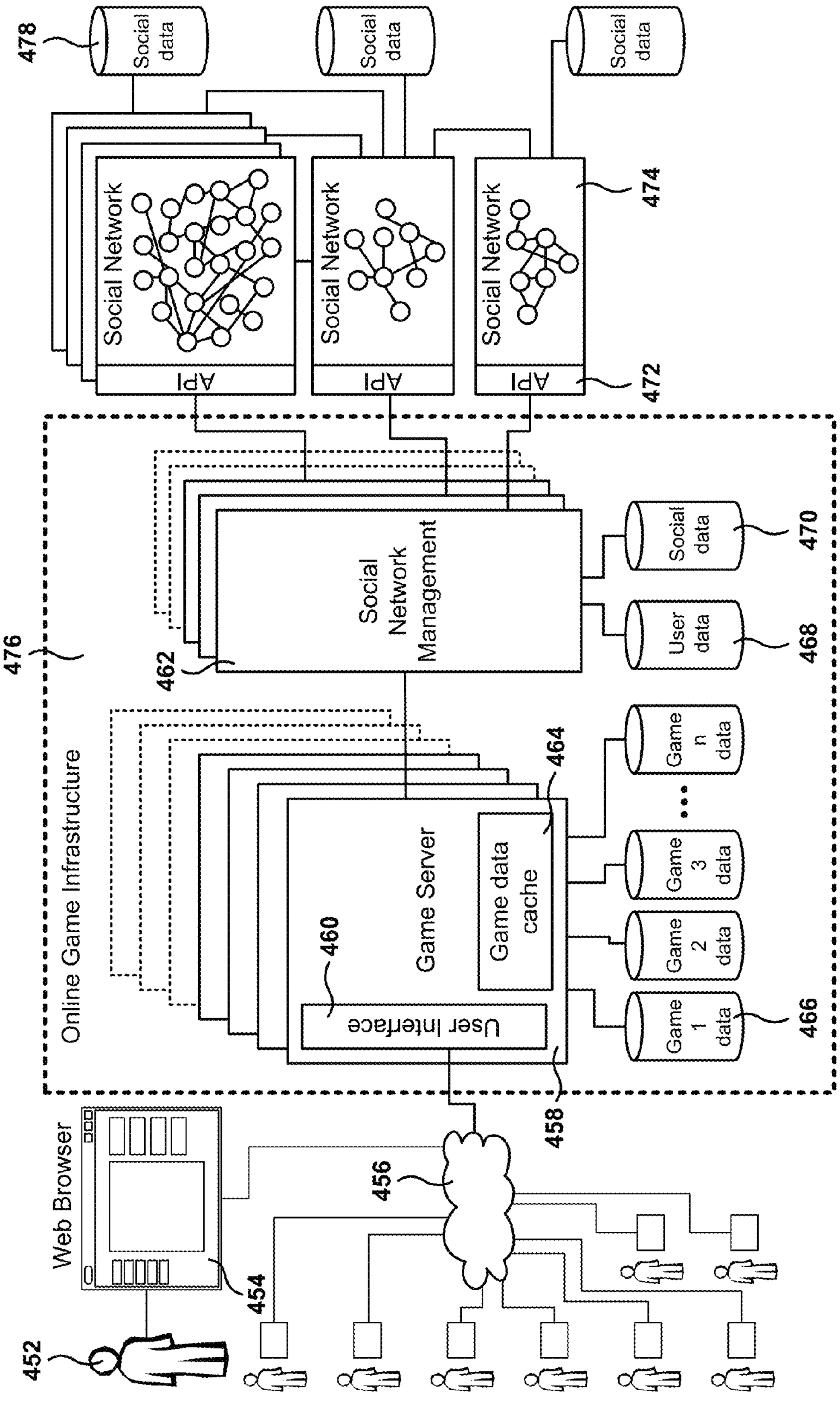
FIG. 10 illustrates an implementation of a Massively Multiplayer Online (MMO) infrastructure, according to one embodiment.

FIG. 10 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also includes one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 10 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 10 should therefore not be interpreted to be exclusive or limiting, but rather exemplary or illustrative.

Figure 11:
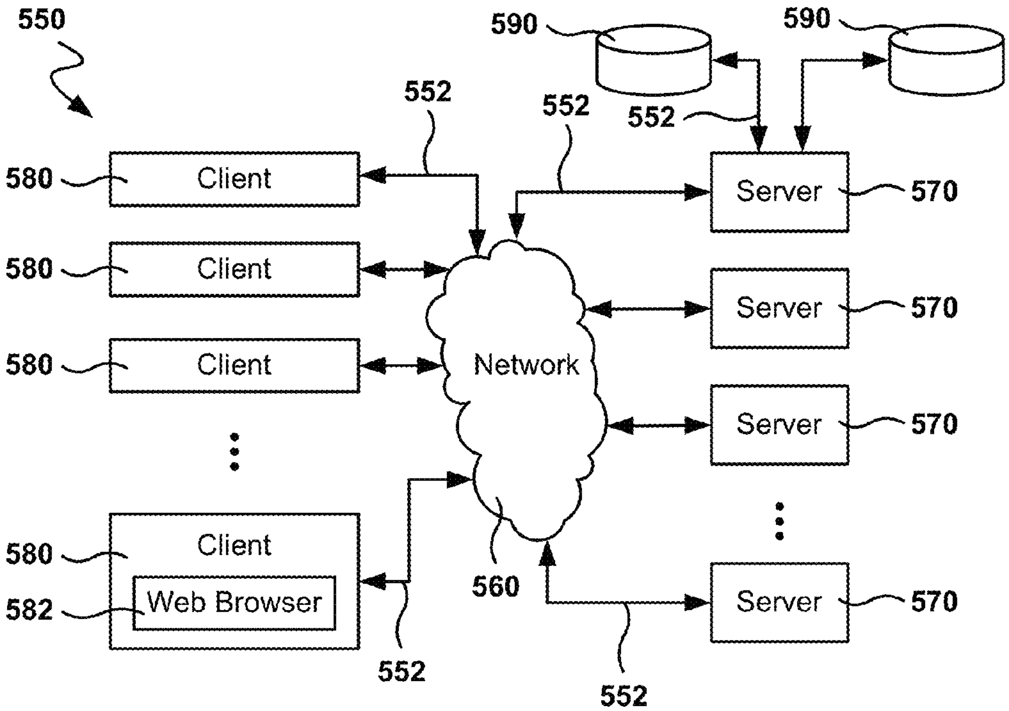
FIG. 11 illustrates an example network environment suitable for implementing embodiments of the invention.

FIG. 11 illustrates an example network environment 550 suitable for implementing embodiments of the invention. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HTML files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 12:
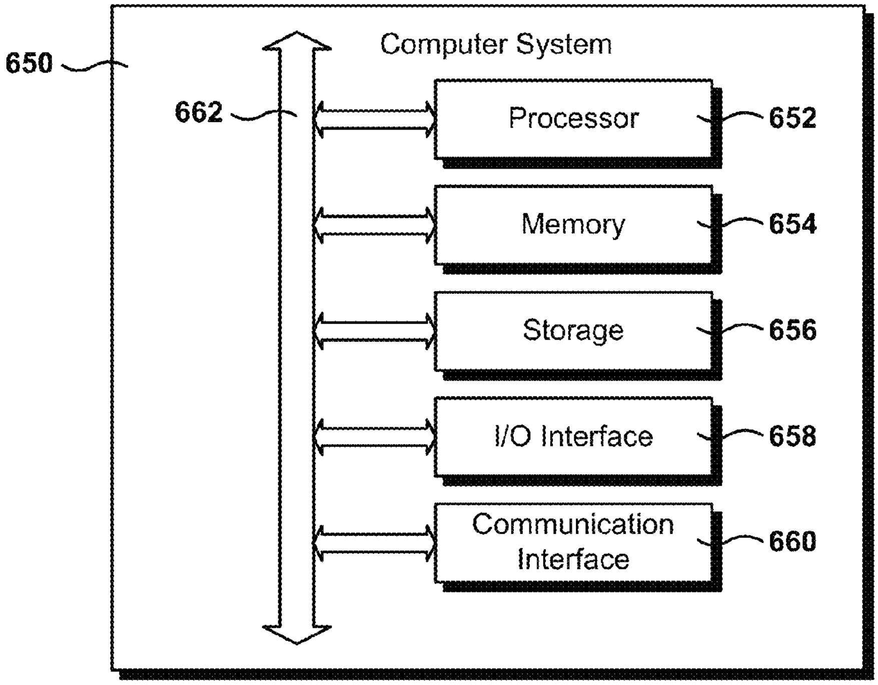
FIG. 12 illustrates an example computer system for implementing embodiments of the invention.

FIG. 12 illustrates an example computer system 650 for implementing embodiments of the invention. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include an HDD, a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments of the present invention can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method, the method comprising:

providing access to a plurality of online games and to a wrapper game, wherein each of the online games and the wrapper game is directly accessible to be loaded utilizing a corresponding internet address which is different for each online game, wherein the wrapper game includes options to load any of the plurality of online games; and providing a chat interface in the plurality of online games and the wrapper game, wherein the chat interface allows users accessing any of the online games to exchange messages with other users accessing any of the online games, wherein the chat interface is unavailable to users currently absent from the online games and absent from the wrapper game, wherein each online game and the wrapper game is a non-monolithic program that requires execution to enable play, wherein the chat interface provides exchange of communications between client computers executing a same non-monolithic program and the chat interface provides exchange of communications between client computers executing different non-monolithic programs for playing respective online games;

invoking an API of a social network to identify friends in the social network of a player accessing any of the online games or the wrapper game; and providing an information area with information about the friends of the player, wherein the operations of the method are executed by a processor.

2. The method as recited in claim 1, wherein each non-monolithic program is a program that, when loaded and executed, provides access to one online game, wherein accessing another online game from the non-monolithic program requires that another non-monolithic program be loaded and executed by a computing device.

3. The method as recited in claim 1, wherein the online games are casino games and the wrapper game represents a lobby of a casino.

4. The method as recited in claim 1, further including:

providing a shared navigation bar, wherein each of the online games includes the shared navigation bar in a graphic user interface (GUI) of the online game; and providing a link in the shared navigation bar to the chat interface.

5. The method as recited in claim 1, the information area having information about which friends are playing any of the online games and a room within an online game where a playing friend is playing.

6. The method as recited in claim 1, wherein progress made in each online game is independent from progress made in other online games.

7. The method as recited in claim 1, wherein a first user and a second user accessing different online games from the plurality of online games have access to the chat interface to exchange messages while playing, wherein a third user not accessing any of the online games and not accessing the wrapper game does not have access to the chat interface.

8. The method as recited in claim 1, further including:

providing a currency that is shared by the plurality of online games.

9. A method, the method comprising:

providing access to a plurality of online games and to a wrapper game, wherein each of the online games and the wrapper game is directly accessible to be loaded utilizing a corresponding internet address which is different for each online game, wherein the wrapper game includes options to load any of the plurality of online games;

providing a chat interface in the plurality of online games and the wrapper game, wherein the chat interface allows users accessing any of the online games to exchange messages with other users accessing any of the online games, wherein the chat interface is unavailable to users currently absent from the online games and absent from the wrapper game;

invoking an API of a social network to identify friends in the social network of a first player accessing any of the online games or the wrapper game; and providing a playing-together interface to the first player to play with a second player that is a friend of the first player in the social network, wherein the first player and the second player playing together move together from online game to online game and from room to room within any online game, wherein each online game and the wrapper game is a non-monolithic program that requires execution to enable play, wherein the chat interface provides exchange of communications between client computers executing a same non-monolithic program and the chat interface provides exchange of communications between client computers executing different non-monolithic programs for playing respective online games, wherein the operations of the method are executed by a processor.

10. The method as recited in claim 9, wherein each non-monolithic program is a program that, when loaded and executed, provides access to one online game, wherein accessing another online game from the non-monolithic program requires that another non-monolithic program be loaded and executed by a computing device.

11. The method as recited in claim 9, wherein the online games are casino games and the wrapper game represents a lobby of a casino.

12. The method as recited in claim 9, further including:

providing a shared navigation bar, wherein each of the online games includes the shared navigation bar in a graphic user interface (GUI) of the online game; and providing a link in the shared navigation bar to the chat interface.

13. The method as recited in claim 9, further including:

providing an information area with information about the friends of the first player, the information area having information about which friends are playing any of the online games and a room within an online game where a playing friend is playing.

14. The method as recited in claim 9, wherein progress made in each online game is independent from progress made in other online games.

15. The method as recited in claim 9, wherein a first user and a second user accessing different online games from the plurality of online games have access to the chat interface to exchange messages while playing, wherein a third user not accessing any of the online games and not accessing the wrapper game does not have access to the chat interface.

16. The method as recited in claim 9, further including:

providing a currency that is shared by the plurality of online games.

17. A non-transitory computer-readable storage medium storing a computer program, the computer-readable storage medium comprising:

program instructions for providing access to a plurality of online games and to a wrapper game, wherein each of the online games and the wrapper game is directly accessible to be loaded utilizing a corresponding internet address which is different for each online game, wherein the wrapper game includes options to load any of the plurality of online games;

program instructions for providing a chat interface in the plurality of online games and the wrapper game, wherein the chat interface allows users accessing any of the online games to exchange messages with other users accessing any of the online games, wherein the chat interface is unavailable to users currently absent from the online games and absent from the wrapper game, wherein each online game and the wrapper game is a non-monolithic program that requires execution to enable play, wherein the chat interface provides exchange of communications between client computers executing a same non-monolithic program and the chat interface provides exchange of communications between client computers executing different non-monolithic programs for playing respective online games;

program instructions for invoking an API of a social network to identify friends in the social network of a player accessing any of the online games or the wrapper game; and program instructions for providing an information area with information about the friends of the player.

18. The non-transitory computer-readable storage medium as recited in claim 17, wherein the online games are casino games and the wrapper game represents a lobby of a casino.

19. The non-transitory computer-readable storage medium as recited in claim 17, further including:

program instructions for providing a shared navigation bar, wherein each of the online games includes the shared navigation bar in a graphic user interface (GUI) of the online game; and program instructions for providing a link in the shared navigation bar to the chat interface.

20. The method as recited in claim 1, wherein each non-monolithic program is executed within a web browser for playing the respective online game or the wrapper game, wherein a client executing a first non-monolithic program for a first online game loads and executes a second non-monolithic program for playing a second online game different from the first online game.

* * * * *